July 27, 1965   L. J. MILLER   3,197,297
APPARATUS AND METHOD FOR CASTING GLASS
Filed March 14, 1960   3 Sheets-Sheet 1

INVENTOR.
LEON J. MILLER
BY
Oscar H. Spencer
ATTORNEY

July 27, 1965   L. J. MILLER   3,197,297
APPARATUS AND METHOD FOR CASTING GLASS
Filed March 14, 1960   3 Sheets-Sheet 3

INVENTOR.
LEON J. MILLER
BY Oscar L. Spencer
ATTORNEY 3,197,297
APPARATUS AND METHOD FOR
CASTING GLASS
Leon J. Miller, Kittanning, Pa., assignor to Pittsburgh
Plate Glass Company, a corporation of Pennsylvania
Filed Mar. 14, 1960, Ser. No. 14,896
10 Claims. (Cl. 65—122)

This application relates to the manufacture of optical quality cast glass articles and especially to the manufacture of massive optics, as for example, parts of radiation shielding windows which are extremely large and have angular peripheral portions. Of course, it is to be understood that the process and apparatus are applicable for the manufacture of other types of optical quality cast glass massive articles having angularly peripheral portions and is not limited to the manufacture of parts of radiation shielding windows.

In the manufacture of optical quality cast glass articles, it is essential that the cast glass article have no visible striations which would affect and distort the passage of light therethrough. In other words, the glass article should exhibit an appearance of a homogeneous mass of glass. This presents a problem because of the size limitations of the optical melting tanks which are generally of relatively small capacity as compared with the capacity of tanks for the melting of plate or window glass, and of the glass refining means such as glass stirrers. Thus, a relatively long period of time is required for the cast of one of these articles.

It has been found that by using the invention herein to be described, successful casts of optical quality massive glass articles having angular peripheral portions can be made.

Broadly, this invention contemplates the combination of a mold having a bottom which is movable vertically and positioned a relatively short distance from a glass discharge orifice at the initiation of a cast, so that the stream of glass does not spiral upon the initiation of the cast. Spiraling of the molten glass stream would result in the formation of the striations affecting the optical properties of the cast. Glass is accumulated within the mold and on the bottom thereof until the desired quantity is accumulated. During the time interval between the initiation and completion of the cast, the mold bottom is moved away from the discharge orifice in such a manner as to maintain a substantially uniform glass stream length so as to prevent spiraling of the stream. Temperature control means are provided in order to insure complete filling of the mold and to maintain the upper portion of the accumulated glass at a predetermined temperature. The upper temperature control means provides a closed chamber above the glass and thus prevents cold air currents from crossing the glass surface.

Looking now at the drawings forming a part of this disclosure and wherein like reference characters refer to like parts, FIG. 1 is a side view of the apparatus of this invention;

Figure 1:
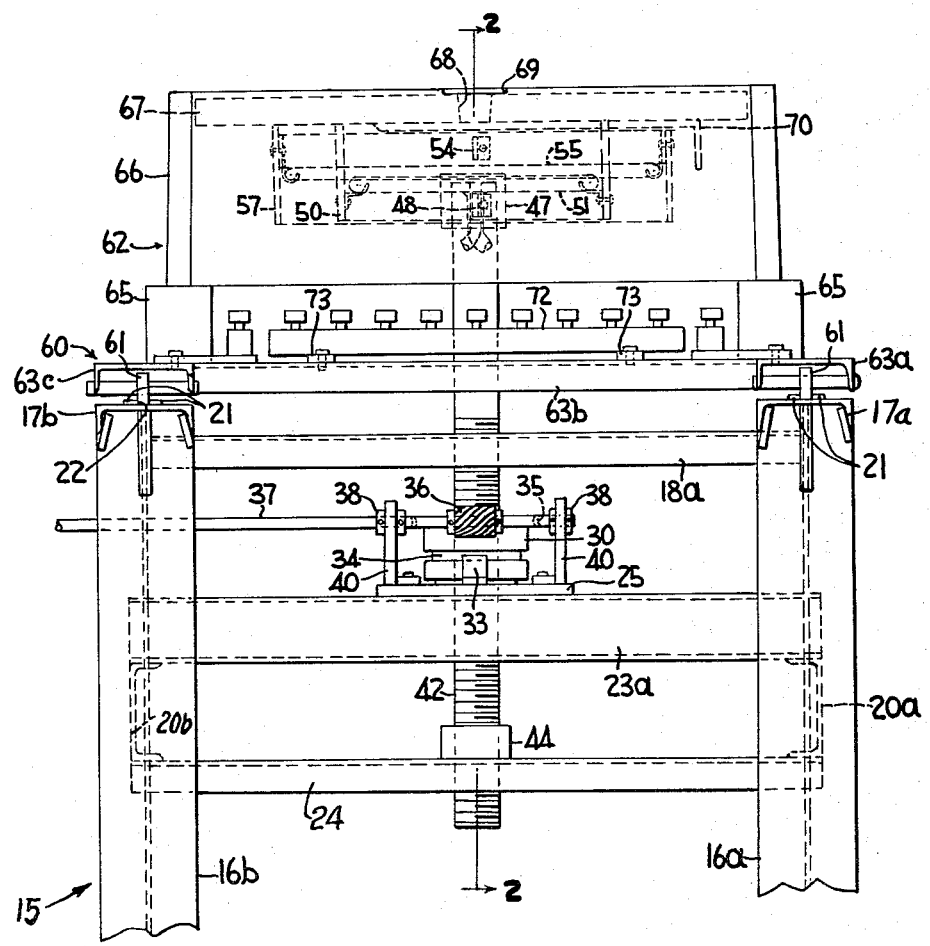
Figure 2:
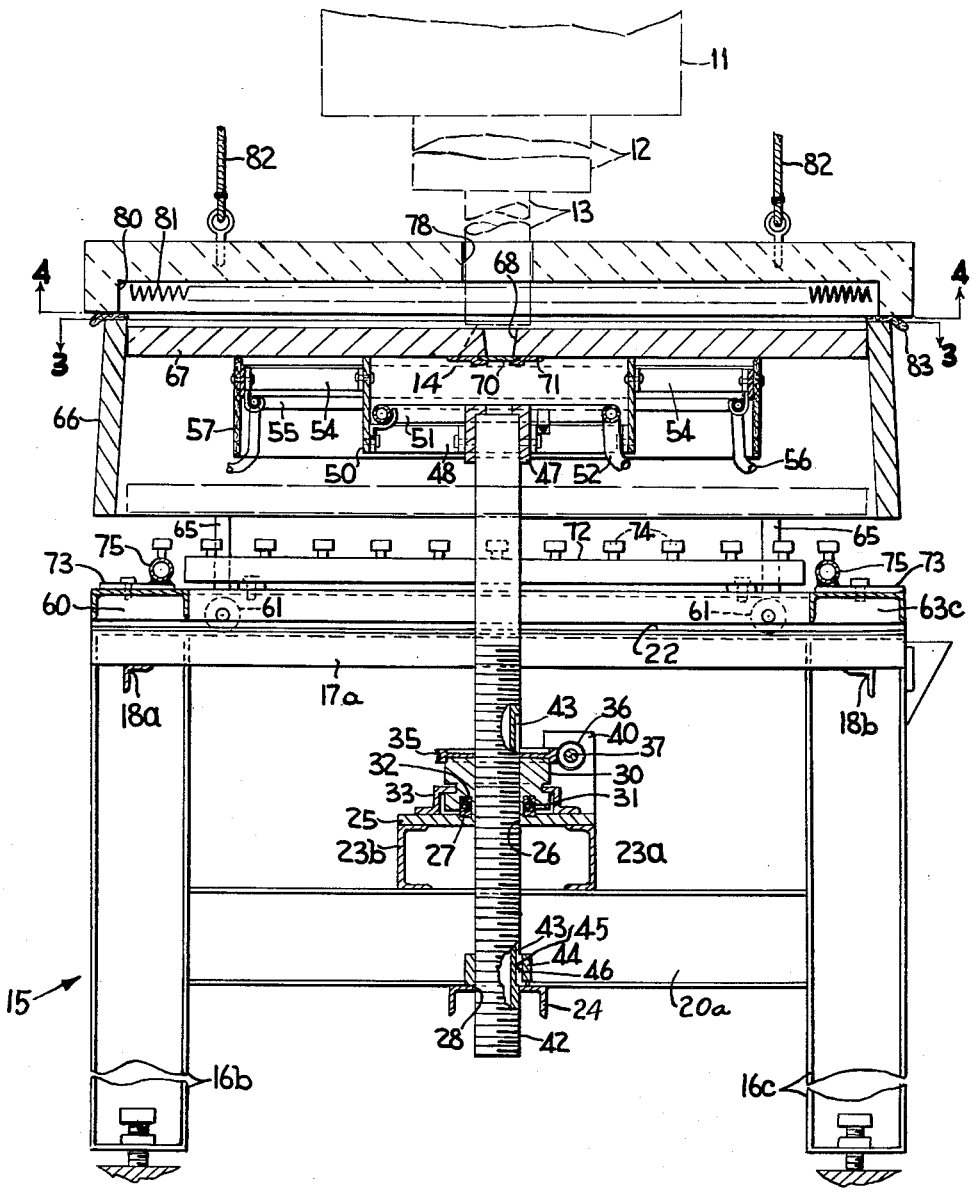
FIG. 2 is a view taken on line 2—2 of FIG. 1, with a mold and its bottom positioned for a cast, a glass melting tank, a refining or stirring chamber connected to the tank and the glass discharge orifice.

Referring now to the drawings, and especially FIGS. 1 and 2, there is illlustrated a glass melting tank 11 of conventional design, preferably for producing optical quality glass. As such, its capacity is relatively small as compared with those tanks for producing plate or window glass. A refining or stirring chamber 12 is connected to the tank 11 to receive and homogenize all the glass discharged from the tank 11. The stirring chamber 12 and its contained stirring mechanism may be of the constructions shown in United States Letters Patents Nos. 2,746,729 and 2,891,771, issued respectively on May 22, 1956, and June 23, 1959, to M. M. Eakins and J. S. Gregorius, or of other suitable design. Because the particular stirring mechanism forms no part of this invention, it is not illustrated. The stirring chamber discharges into a substantially vertically positioned orifice tube 13 which terminates in a glass discharge orifice 14.

The structure of this invention, generally referred to by the reference character 15 is positioned below the tank 11.

The structure 15 is of metal and includes a rectangular framework having vertical corner posts or beams 16a, 16b, 16c and 16d (not shown but identical to the other posts or beams), top horizontal channels 17a and 17b, top horizontal angles 18a and 18b and intermediate horizontal members 20a and 20b. These structural members are welded or bolted together to form a rigid framework. The channels 17a and 17b are positioned with their webs facing upwardly and have spaced guide members 21 welded or bolted thereto, thus forming a horizontally extending guide channel 22 between pairs of guide members, the purpose of which will be later described.

Spaced channel members 23a and 23b span the intermediate members 20a nad 20b and are welded or bolted thereto on their upper flanges. A channel 24 also spans the intermediate members 20a and 20b and is welded or bolted thereto on their lower flanges. A plate 25 having a central opening 26 and an annular cavity 27 is supported and connected to the channel members 23a and 23b. Preferably, the opening 26 is aligned centrally of the rectangle defined by the framework corner posts or beams 16. The channel 24 is provided with an opening 28 in vertical alignment with the opening 26.

An internally threaded annular element 30 is rotatably supported on annular bearings 31 received within the cavity 27 and an annular groove 32 within the element 30 itself. The element 30 is maintained in position with its bore vertically aligned with the opening 26 by brackets 33 connected to the plate 25 and having portions received within a circumferential groove 34 in the element 30. A pinion 35 is connected to the element 30 and meshes with a worm gear 36 fixed to a horizontally extending shaft 37 rotatably supported in spaced bearings 38 which in turn are received in openings in upstanding supports 40 fixed to the plate 25. The shaft 37 is connected to an intermittently operated driving means, such as an electric motor (not shown) or may have a hand crank affixed thereto.

A vertically extending, hollow, externally threaded screw 42 is received within the internally threaded element 30 and also extends downwardly through the opening 28 in the channel 24, the screw 42 being also provided with a longitudinally extending key-way 43 for a portion of its length. A sleeve 44 having a key-way 45 is connected to the channel 24 and a key 46 is positioned within the key-ways 43 and 45. Thus rotation of the element 30 causes vertical but not rotational movement of the screw 42.

Figure 3:
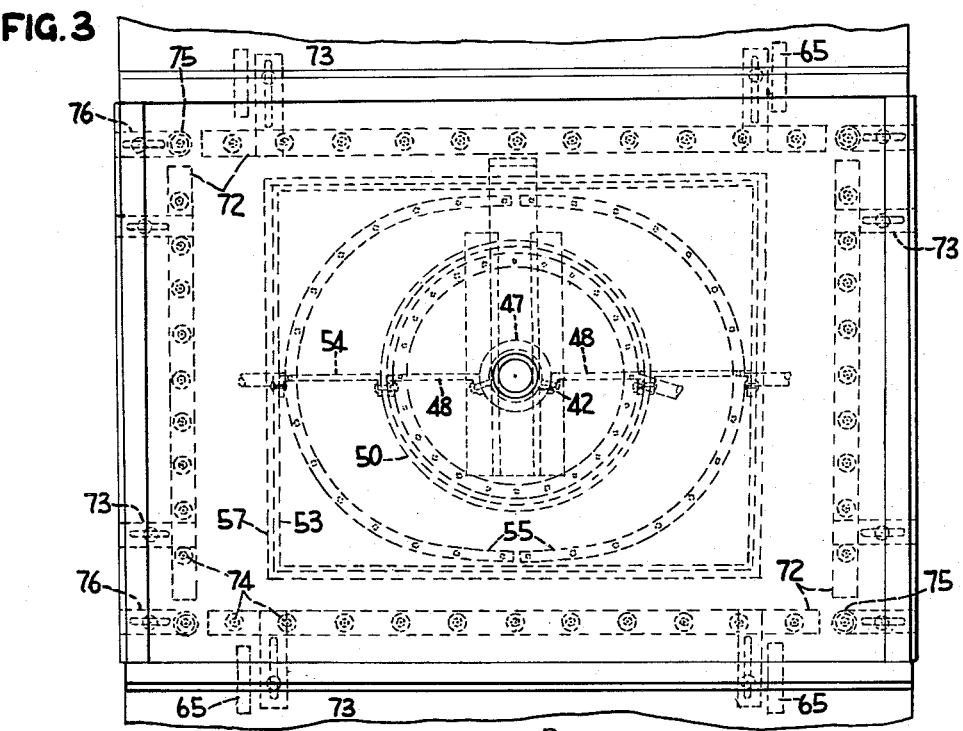
FIG. 3 is a view taken on line 3—3 of FIG. 2 omitting for sake of clarity the supporting structure.

A cap sleeve 47 is disposed over the upper end of the screw 42 and has outwardly horizontally extending arms 48 connected thereto. A cylindrical member 50 is in turn connected to the arms 48 with its upper edge lying in a horizontal plane above the cap sleeve 47. An air manifold 51 of piping is supported on the arms 48 within the member 50 with a plurality of air discharge openings facing upwardly, and is connected to a suitable source of air under pressure (not shown) by means of a flexible hose 52. A rectangular frame 53 surrounding the member 50 is supported by arms 54 connected to the member 50 and a sectional air manifold 55 of piping is connected to the lower portions of the arms 54, the manifold 55 having a plurality of air discharge openings facing upwardly and being connected to a suitable source of air under pressure (not shown) by means of a flexible hose 56. An asbestos curtain 57 hangs from the frame 53 and extends below the level of the manifold 55. As illustrated in FIG. 3 and described, the air manifolds 51 and 55 are arcuate in plan view; however, they could be of other configuration without departing from the spirit of this invention. This also applies to the configurations of the member 50 and the frame 53. The functions of the air manifolds 51 and 55, the member 50 and the frame 53 will be apparent as the description proceeds.

A carriage 60 having rollers 61 receivable within the guide channels 22 for moving a mold, preferably of cast iron and generally indicated at 62, into and out of casting position beneath the glass discharge orifice 14. The carriage comprises a frame of channels 63a, 63b, 63c and 63d (not shown but identical with 63c) with the rollers (four being shown) rotating about axles fixed to the channels 63a and 63c. Spaced pairs of supports 65 are welded to the channels 63a and 63c and these support the sides 66 of the mold 62. Also, the supports 65 support the bottom 67 of the mold 62 when the mold is moved into and out of the initial casting position, and form stops for limiting the downward movement of the mold bottom 67, as will be later explained. The mold bottom 67 is a glass receiving support.

The mold 62 is, as illustrated, generally rectangular in outline, and includes the previously mentioned side walls 66 and separate bottom 67. The walls 66 constitute confining means for the glass. Thus, the mold 62 has angular peripheral portions defined by the juncture of adjacent walls and bottom. The inner walls of the mold are tapered from top to bottom, so that the opening defined by the walls is larger at the bottom than at the top. The bottom 67 is slightly smaller than the opening defined by the side walls at the top of the mold, and also has a central opening 68 therethrough, which is aligned with the hollow screw 42 when in molding position. One side wall of the mold is notched, at as 69, so as to clear the orifice tube 13 when the mold is rolled into position. A gate or closure member 70 slidable in guideways 71 is provided for closing the opening 68 upon initiation of a cast of glass. As will be noted the dimensions of the mold are very large when compared with the dimensions of the glass stream and the discharge orifice.

A plurality of longitudinally extending burners 72 are connected to the channels 63a, 63b, 63c, and 63d for adjustment in a horizontal plane by means of brackets 73. These burners are provided with orifices 74 so as to direct their flames generally upwardly toward the mold 62 and are slightly shorter than the length of each side of the mold. Other single corner burners 75 are provided for each corner of the mold as illustrated in FIG. 5 and the position of the burners 72 which are mounted for projecting their flames generally upwardly is adjustable because of their supports 76 connected also to the frame defined by the channels 63a, 63b, 63c and 63d.

A top heater 77 of a configuration similar to the mold 62 is provided for initially heating the mold and thereafter heating the upper portion of the glass discharged into the mold, and is movable vertically into and out of position. This heater is constructed of a refractory material and has a central opening 78 so that it surrounds the orifice tube 13 and a cavity 80 substantially the same size and configuration of the interior of the mold. Electric heater coils 81 are supported within the cavity 80 and are connected to a suitable source of electric power (not shown). A cable arrangement 82 provides the means for raising and lowering the top heater 77.

Figure 4:
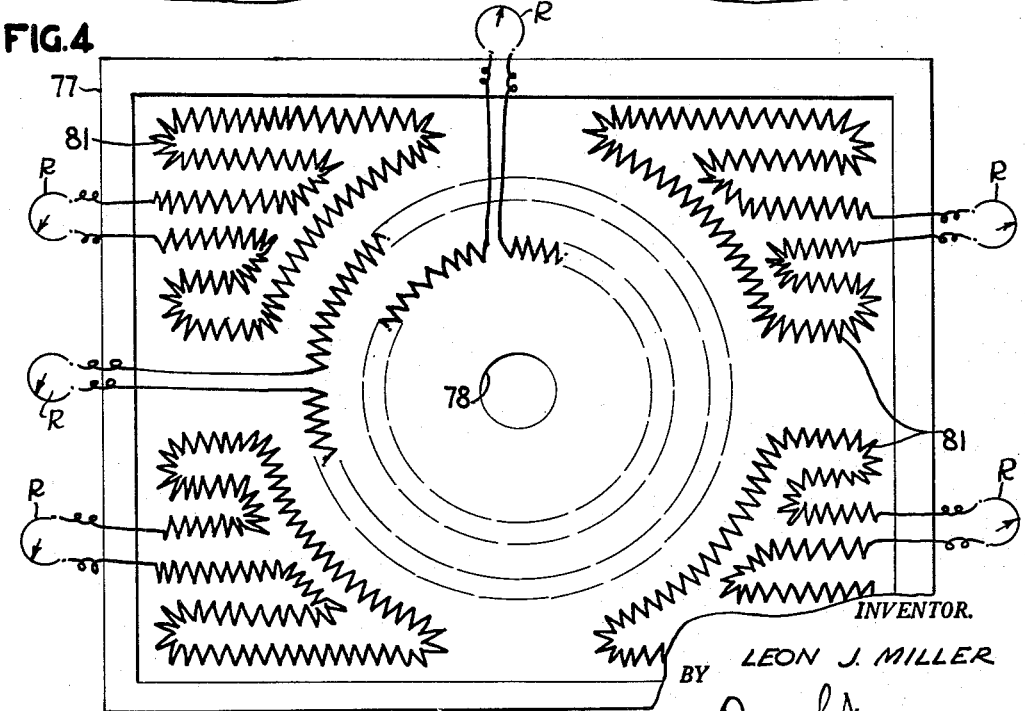
FIG. 4 is a view taken on line 4—4 of FIG. 2 illustrating particularly the top temperature control means and omitting for sake of clarity the glass melting tank and stirring chamber.

As illustrated in FIG. 4, there are preferably six heating zones in the top heater, each of which may be energized separately by means such as rheostats R (see FIG. 4) or other well-known conventional means of similar function to provide the necessary temperature control. When the top heater is in use, and in its lower position, an asbestos strip 83 is positioned between the top heater and the mold walls 66.

The operaton of the device and the method of casting the glass article will now be described. It is to be assumed that the glass melting tank 11 is continuously operating and a molten glass stream is being discharged through the glass discharge orifice 14. At this time the screw 42 is in a lowered position, so that the entire structure supported by the screw 42 is below the upper level of the framework members 17a and 17b and the burners 72 and 75 are not fixed in position. Because the hollow screw 42 is aligned with the orifice 14, the stream passes therethrough and into a cullet collection container (not shown). At this time the top heater 77 surrounds the orifice tube 13 and is supported above the orifice 14 with the heater coils 81 not energized.

The mold 62, preferably of cast iron, is then prepared for use or has been prepared for use by spraying the glass contacting surfaces with a glass releasing agent, such as a water slurry of 5% bentonite and 95% silica. As an alternative, the glass contacting surfaces may be lined with graphite. The mold side walls 66 and the mold bottom 67 are supported on a carriage 60 and the mold is aligned horizontally by horizontally aligning the rollers 61 with the guide channels 22. The lower portion of the mold side walls are then wrapped tightly with layers of asbestos which remain on the mold during the entire casting operation for temperature control reasons. The mold is then moved into place, i.e., the carriage rollers 61 engage the guide channels 22, and the mold bottom opening 68 is aligned with the orifice 14, so that the glass stream issuing from the orifice 14 falls through the opening 68 and the hollow screw 42.

The burners 72 and 75 are then set into position, gas is turned on and they are lighted. The screw 42 is raised by means of the pinion 35 and worm 36, so that the member 50 engages the underside of the mold bottom 67 and raises the bottom 67 from the supports 65 until its top surface is ¼ inch to ⅜ inch from the bottom of the orifice 14. This distance is maintained throughout the cast of the glass article because the glass stream is thus prevented from spiraling.

Because the mold may have accumulated some foreign material during the time interval between its coating and the placement under the orifice, and also because there will be a string of glass across a portion thereof, a high velocity air jet is directed into the mold, so as to clear the mold of this material.

The strip of asbestos 83 is placed around the mold and the top heater 77 is lowered into place. An asbestos curtain is draped around the top heater and the mold. The heater coils 81 of the top heater 77 are then energized and the mold is preheated to take the chill off the mold. The gate or closure member 70 is then moved over the opening 68 in the mold bottom 67 and the cast begins.

As the cast progresses, the bottom mold plate 67 is lowered, keeping the stream length from the orifice to the top surface of the accumulated glass a substantially constant ¼ inch to ⅜ inch. Because of a relatively slow glass discharge rate from the orifice 14, the determination for lowering the mold bottom is made by visual observation; however, if necessary or desirable automatic level control means could be used, so that the mold bottom would be lowered automatically in response to the level of the accumulated glass. During the cast, the temperatures of the mold are taken by automatic means, as for example, radiation temperature indicating means, and when the mold bottom or areas thereof reach a predetermined elevated temperature, the air manifolds 51 and 55 which are actually supported in position on the hollow screw 42 are used, i.e., air is turned on so as to discharge from the manifolds' orifices generally upwardly and against the mold bottom. The air is employed to maintain the mold bottom substantially at this predetermined temperature. The member 50 and the asbestos curtain 57 isolate areas of the mold bottom from other areas. Of course, adjustment of the air supply valves may be required periodically for this purpose, and if the mold gets too hot, some or all of the asbestos drapes may be removed. Also the coils 81 of the top heater 77 may be selectively deenergized so as to maintain the temperature of the accumulated glass surface substantially constant.

When the mold bottom, i.e., the mold bottom 67, touches the supports 65, the cast is completed. The air to the manifolds 51 and 55 is then turned off and the burners 72 and 75 are turned off and moved out of the way. The screw 42 is lowered so that its supported parts disengage the mold bottom and it is moved to the position it occupied when the mold was moved into position. The top heater coils 81 are deenergized and the top heater 80 is raised to a position above the mold. The mold is then moved from beneath the orifice and the cast is annealed. The mold side walls, because of the taper, are easily removed from the cast by lifting upwardly; however, removal of the side walls does not occur for approximately a day after removing the cast from beneath the orifice. The mold bottom remains with the cast until the cast is fully annealed.

After annealing, the cast of glass is then processed for further and ultimate use, the processing including grinding and polishing the surfaces of the cast.

As an example, the glass generally employed for casting radiation shielding windows has a density of 3.3 gm./cc. and such as cast may be on the order of 34⅝ inches x 37¾ inches x 10½ inches which will weigh approximately 1,610 pounds.

I claim:

1. Apparatus for casting glass comprising a downwardly extending glass tank discharge orifice for discharging a stream of molten glass, a mold movable into casting position beneath said orifice, said mold comprising at least one side wall and a bottom plate, said bottom plate being movable with respect to said side wall and having an opening in alignment with said orifice when said mold is in casting position for the passage of glass prior to the initiation of a cast, selectively operable closure means for said bottom plate for closing said opening upon initiation and continuance of a cast, means for selectively moving said bottom plate toward and away from said orifice to thereby move said bottom plate with respect to said side wall and maintain a substantially uniform glass stream length during the cast.

2. Apparatus for casting glass comprising a downwardly extending glass tank discharge orifice, a mold movable into and out of casting position beneath said orifice, said mold comprising at least one side wall having a taper so that the area defined by said wall at the top of the mold is smaller than the area defined by said wall at the bottom of said mold and a bottom plate the area of which is substantially the same as the smaller area defined by said side wall, said bottom plate having an opening in alignment with said orifice and said plate being vertically movable within said side wall, means for moving said bottom plate to a position closely adjacent said orifice upon initiation of a cast and for lowering said bottom plate as the cast progresses at a controlled rate so as to maintain a substantially constant glass stream length during the cast, selectively operable closure means for said bottom plate for closing said opening upon initiation and continuance of a cast and means to limit the downward movement of said bottom plate and indicate completion of said cast.

3. Apparatus as recited in claim 2 wherein said lastnamed means also comprise support means to support said mold side wall and said mold bottom plate upon movement of said mold into and out of casting position.

4. Apparatus for casting glass comprising a downwardly extending glass tank discharge orifice, a mold beneath said orifice to receive molten glass from said orifice, means to support said mold beneath said orifice, said mold having a plurality of side walls which join and define angular peripheral mold portions and a bottom plate, said bottom plate being movable with respect to said side wall and having an opening in alignment with said orifice when said mold is in casting position for the passage of glass prior to the initiation of a cast, selectively operable closure means for said bottom plate for closing said opening upon initiation and continuance of a cast, a cover member mounted for movement over said mold and having an opening for surrounding said orifice, said cover member having substantially the same configuration as the area defined by said mold walls and having heating means attached to its lower surface to thereby provide heat to preheat said mold and to maintain the upper portion of glass accumulated within said mold at an elevated temperature, and additional heating means mounted on said support means to direct their heat only at the lower portion of said mold and each at a juncture of a pair of adjacent mold walls, said additional heating means insuring the flow of glass into said angles defined by joined side walls.

5. Apparatus as recited in claim 4 wherein said firstnamed heating means includes a plurality of separate heating devices for providing a like number of heating zones and further including means operatively associated therewith for selectively operating said heating devices so as to selectively heat their respective heating zones.

6. Apparatus as recited in claim 4 further including mold temperature control means supported by said support means and positioned beneath said mold so as to maintain said mold at a predetermined temperature.

7. Apparatus as recited in claim 6 wherein said mold temperature control means includes selectively operable cooling means positioned and supported beneath the bottom of said mold so as to cool selected portions of said mold bottom.

8. Apparatus for casting glass comprising a downwardly extending glass tank discharge orifice, a supporting framework located beneath said orifice, hollow means supported by said framework and aligned with said orifice for the passage of molten glass therethrough, horizontal guide means on said supporting framework, carriage means disposed on said guide means, for movement therealong from an external position to a casting position, a mold removably disposed on said carriage means for movement into casting position so as to have predetermined location with respect to said orifice and said hollow means, said mold comprising continuous side walls tapering from top to bottom and a bottom plate extending substantially between said side walls, an opening in said bottom plate and aligned with said orifice and said hollow means when said mold is in casting position, selectively operable closure means for said bottom plate opening, means including said hollow means for selectively raising and lowering said bottom plate toward and away from said orifice, means for limiting downward movement of said mold bottom, means for selectively cooling portions of said bottom plate, means for selectively heating said mold side walls and said bottom plate, a mold top having a passage therethrough through which said tank orifice extends, means for raising and lowering said mold top to and from said mold, so as to rest on said mold when in casting position, and heater means carried by said mold top for selectively heating glass discharged into said mold.

9. Apparatus for casting glass comprising a downwardly extending glass tank discharge orifice, a supporting framework located beneath said orifice and having vertically movable hollow means aligned with said orifice for the passage of molten glass therethrough, guide means on said supporting framework, carriage means movable on said guide means, a mold on said carriage means for movement beneath said orifice into casting position in a predetermined relationship with said orifice and said hollow means, said mold comprising continuous side walls and a bottom plate movable within said side walls, an opening in said bottom plate aligned with said orifice and said hollow means when said mold is in casting position, selectively operable closure means for said bottom plate opening, means for selectively raising and lowering said bottom plate so as to move said bottom plate toward and away from said orifice and within said side walls, said selectively raising and lowering means including said vertically movable hollow means, a threaded outer surface on said hollow means, a gear mounted for rotation about a fixed axis meshing with said threaded surface, and means for intermittently rotating said gear and thereby vertically moving said hollow means, means on said carriage means for limiting downward movement of said mold bottom, means for selectively cooling centrally located selected portions of said bottom plate, means for selectively heating said mold side walls and corners of said bottom plate, a mold top having a passage therethrough for said tank orifice and heater means carried by said mold top for initially preheating said mold and thereafter selectively heating the adjacent located glass discharged into said mold.

10. A method of casting glass comprising, establishing a downwardly directed stream of molten glass, placing a glass confining means and a glass receiving support beneath said stream of molten glass, permitting said stream of glass to pass said support so that said support is free of glass, selectively heating said confining means and said support to a first predetermined temperature, interrupting said stream of glass to allow said glass to flow onto said support, accumulating a mass of glass on said support within said confining means and progressively moving said support downwardly as said glass accumulates thereon and maintaining a substantially uniform glass stream length, selectively and continuously heating the top surface of said accumulated glass, selectively cooling and heating portions of said support to maintain said support at a second predetermined temperature, and removing said accumulated glass from beneath said stream when a predetermined quantity of glass has been accumulated on said support within said confining means.

References Cited by the Examiner

UNITED STATES PATENTS

| | | | |
|---|---|---|---|
| 125,165 | 4/12 | Bowie | 65—361 |
| 484,131 | 10/92 | Atterbury | 65—231 |
| 1,603,221 | 10/26 | Thomson | 65—123 |
| 1,801,306 | 4/31 | Drake | 65—126 |
| 2,210,583 | 8/40 | Henry | 65—162 |
| 2,215,214 | 9/40 | Galey | 65—69 |
| 2,317,597 | 4/43 | Ford et al. | 18—38 |
| 2,534,415 | 12/50 | Cleveland et al. | 65—66 |
| 2,920,359 | 1/60 | Easton | 22—57.2 |
| 2,942,293 | 6/60 | Wahl | 18—15 |

FOREIGN PATENTS 21,463   9/05   Austria.

DONALL H. SYLVESTER, *Primary Examiner.*

IVAN R. LADY, *Examiner.*